United States Patent Office 2,947,795
Patented Aug. 2, 1960

2,947,795

PROCESS FOR STABILIZING MONOVINYLACETY-LENE CONTAINING IMPURITIES

Robert W. Keown, Montague, Mich., assignor to E. I. du Pont de Nemours and Company, Wilmington, Del., a corporation of Delaware No Drawing. Filed Dec. 5, 1958, Ser. No. 778,312

3 Claims. (Cl. 260—678)

This invention is directed to a method for stabilizing acetylene dimers and trimers during their distillation, handling and storage. In particular, the present invention concerns a process for stabilizing monovinylacetylene containing impurities such as divinylacetylene, 1,3-hexadien-5-yne, butatriene, chloroprene, vinyl chloride and acetaldehyde.

Monovinylacetylene, which is an important neoprene intermediate, may be prepared from acetylene by a continuous process similar to that described in U.S. Patent 2,759,985. Humidified acetylene rises through a series of communicating reaction zones at a temperature between about 60 and 75° C., where it is contacted counter currently by an aqueous acidified solution of cuprous chloride. About 2–25% conversion occurs each time the acetylene passes through the reactor. The warm humid mixture obtained is dried and cooled (as described by U.S. 2,796,448) so that the monovinylacetylene can be separated from the acetylene by fractionation or absorption in solvent such as acetone. This monovinylacetylene contains impurities such as divinylacetylene, 1,3-hexadien-5-yne, butatriene, chloroprene, vinyl chloride and acetaldehyde; the mixture resulting from this process is not entirely stable and will deposit an insoluble solid from either the vapor or the liquid phase and necessitates inconvenient and costly cleaning operations. For example, when an acetone solution of monovinylacetylene and the impurities is introduced into a column which is under total reflux, polymer is deposited so rapidly in the packing elements that the equipment must be shut down for cleaning operations approximately once a week.

The process by which this polymer forms is unknown. Interaction of one or more of these impurities (except divinylacetylene) with monovinylacetylene by a process as yet not understood appears to cause this solid polymer formation; neither pure monovinylacetylene nor a mixture of pure monovinylacetylene and divinylacetylene give solid polymer.

It is an object of the present invention to stabilize monovinylacetylene containing solid-forming impurities to avoid objectionable polymer formation. It is another object of the present invention to stabilize monovinylacetylene containing these impurities. It is a further object to provide a process for stabilizing mixtures containing monovinylacetylene and small amounts of divinylacetylene, 1,3-hexadien-5-yne, butatriene, chloroprene, vinyl chloride and acetaldehyde. It is a still further object to facilitate the distillation, handling, and storage of monovinylacetylene. It is a yet still further object to retard solid polymer formation from monovinylacetylene containing impurities. It is an additional object to provide an improved process for the recovery of monovinylacetylene from its impurities and acetone solution.

A further object of the present invention is to provide a process for stabilizing monovinylacetylene containing acetaldehyde and acetone which will not cause destruction of these carbonyl compounds. These and other objects will become apparent in the following description and claims.

More specifically, the present invention is directed to a process for retarding the formation of solid polymers in monovinylacetylene containing impurities, such as are formed in its manufacture from acetylene with a cuprous chloride catalyst, which process comprises contacting said monovinylacetylene with 1 to 1,000 parts by million by weight of an organic oxime of a carbonyl compound selected from the group consisting of aldehydes and ketones of the aliphatic, cycloaliphatic, and aromatic series; preferably, said oxime should contain not more than 10 carbon atoms in the molecule.

The process of the present invention unexpectedly stabilizes dimers and trimers of acetylene, particularly monovinylacetylene, containing impurities which cause the formation of solid polymer. The stabilized compositions can now be conveniently distilled, handled, and stored at temperatures ranging between about −70 to 90° C. Solid polymer formation is distinctly retarded as long as the acetylene compounds are contacted with the defined oximes. Acetone oxime, butyraldoxime, butanone oxime, cyclohexanone oxime, benzaldoxime, and acetophenone oxime are representative examples of oximes which may be utilized according to the present invention. When organic solutions of the oximes are used, the preferred organic solvents are polar compounds such as acetone or ethanol.

In a preferred embodiment of the present invention, about 60 parts per million of butyraldoxime is used to stabilize monovinylacetylene made from acetylene by means of a cuprous chloride catalyst and containing impurities as described.

The representative examples which follow will illustrate this preferred embodiment but it is not intended that the invention be limited thereby.

Example I

A. During the separation of monovinylacetylene from acetone and impurities including divinylacetylene, 1,3-hexadien-5-yne, butatriene-1,2,3 and traces of aldehydes and unsaturated chloro-bodies, the solution of monovinylacetylene in acetone enters near the middle of a packed refining column at a temperature of about 85° C. A 5% solution of butyraldoxime in acetone is fed by a metering pump to the top of the refining column. 0.12 pound of the oxime solution is used for every 100 pounds of monovinylacetylene (60 p.p.m. of oxime). Inside the column the monovinylacetylene vapor rises counter current to the butyraldoxime solution and leaves the top of the column at a temperature of about 22° C. From there it goes to a scrubbing tower and the purified monovinylacetylene is subsequently collected and stored. The butyraldoxime solution in the refining column is washed down the column with the refluxing liquid which then passes to another still in which the acetone is separated for re-use and the oxime is purged from the column with the distillation heels. The packing of the monovinylacetylene refining column requires cleaning only about once every three months. There is no evidence that any acetone is lost by conversion to higher-boiling products.

B. Essentially the same results are obtained if the same quantity of a 10% acetone solution of butyraldoxime is used in place of the 5% solution in the procedure of Part A above, giving 120 p.p.m. of oxime.

C. Essentially the same results are obtained if the procedure of Part A is repeated except that 0.96 pound of the 5% solution of butyraldoxime (480 p.p.m. of oxime) is employed for every 100 pounds of monovinylacetylene introduced into the refining column.

D. Essentially the same results are obtained if a 1.5% acetone solution of butyraldoxime (144 p.p.m. oxime)

is substituted for the 5% solution of butyraldoxime in the procedure of Part C above.

E. The procedure of Part A is repeated except that no butyraldoxime solution is used. The monovinylacetylene refining column must be shut down and cleaned within a week.

Example II

A. A drop of butyraldoxime is placed in a 30 ml. heavy-walled glass bulb equipped with a 6-inch heavy-walled capillary stem. The bulb is swept with nitrogen while being cooled to —70° C. The bulb is then filled ⅓ full with a liquid mixture of monovinylacetylene with divinylacetylene and traces of 3-hexadien-5-yne, butatriene, vinyl chloride, chloroprene and acetaldehyde. While the bulb is still cold, the capillary stem is closed. The bulb is subsequently warmed to room temperature and kept at 35° C. for about 16 hours. No deposits of solid polymer form.

B. Similar results are obtained when acetone oxime, butanone oxime, benzaldoxime, acetophenone oxime, or crystals of cyclohexanone oxime are substituted, in turn, for the butyraldoxime in the process of Part A above.

C. When a control experiment is run in which no oxime is used, yellowish solid polymer forms inside the bulb.

It is evident from the results of the above examples that any of the oximes of the defined groups may be used to keep the impure dimers and trimers of acetylene from forming solid polymer. Generally about 60 parts per million of oxime is employed although it is to be understood that as little as 1 part per million provides some protection. There is no advantage in using above 1,000 parts per million of oxime.

Although the present invention is particularly useful for stabilizing monovinylacetylene solutions containing impurities which include divinylacetylene, 1,3-hexadien-5-yne, butatriene, chloroprene, vinyl chloride, and acetaldehyde, it is to be understood that it may also be used to stabilize butatriene and divinylacetylene containing impurities. Since butatriene polymerizes completely in a very short interval of time at normal temperatures, application of the present invention to solutions of said butatriene is considered to be particularly important.

Additional representative oximes which may be utilized according to this invention are: cyclohexyl methyl ketone oxime, benzophenone oxime, camphor oxime, naphthaldoxime, and, dioctyl ketone oxime.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for retarding the formation of solid polymer in monovinylacetylene containing impurities, said monovinylacetylene being prepared from acetylene and a cuprous chloride catalyst, said process comprising the contacting of said monovinylacetylene with from 1 to 1,000 parts per million by weight of an organic oxime of a carbonyl compound selected from the group consisting of aldehydes and ketones of the aliphatic, cycloaliphatic, and aromatic series.

2. The process of claim 1 wherein the oxime utilized contains not more than 10 carbon atoms in the molecule.

3. A process for retarding the formation of solid polymer in monovinylacetylene containing impurities, said monovinylacetylene being prepared from acetylene and a cuprous chloride catalyst, which process comprises contacting said monovinylacetylene with about 60 parts per million by weight of butyraldoxime.

References Cited in the file of this patent
UNITED STATES PATENTS 1,924,979     Calcott et al.  ---------- Aug. 29, 1933